Feb. 17, 1959     F. H. TENNIS     2,873,762
CONTROL VALVE FOR FLUID PRESSURE OPERATED MECHANISMS
Filed June 27, 1955     3 Sheets-Sheet 1
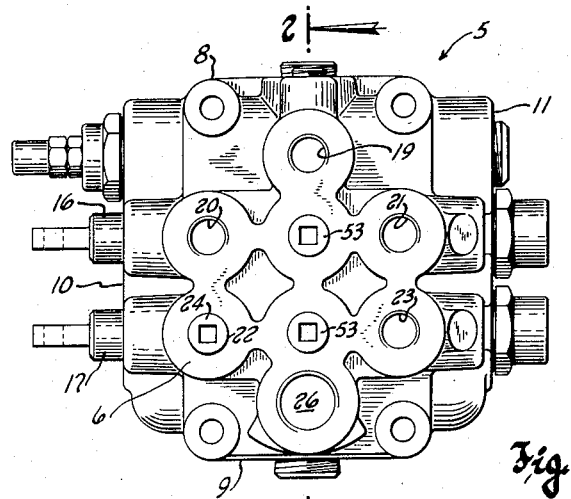
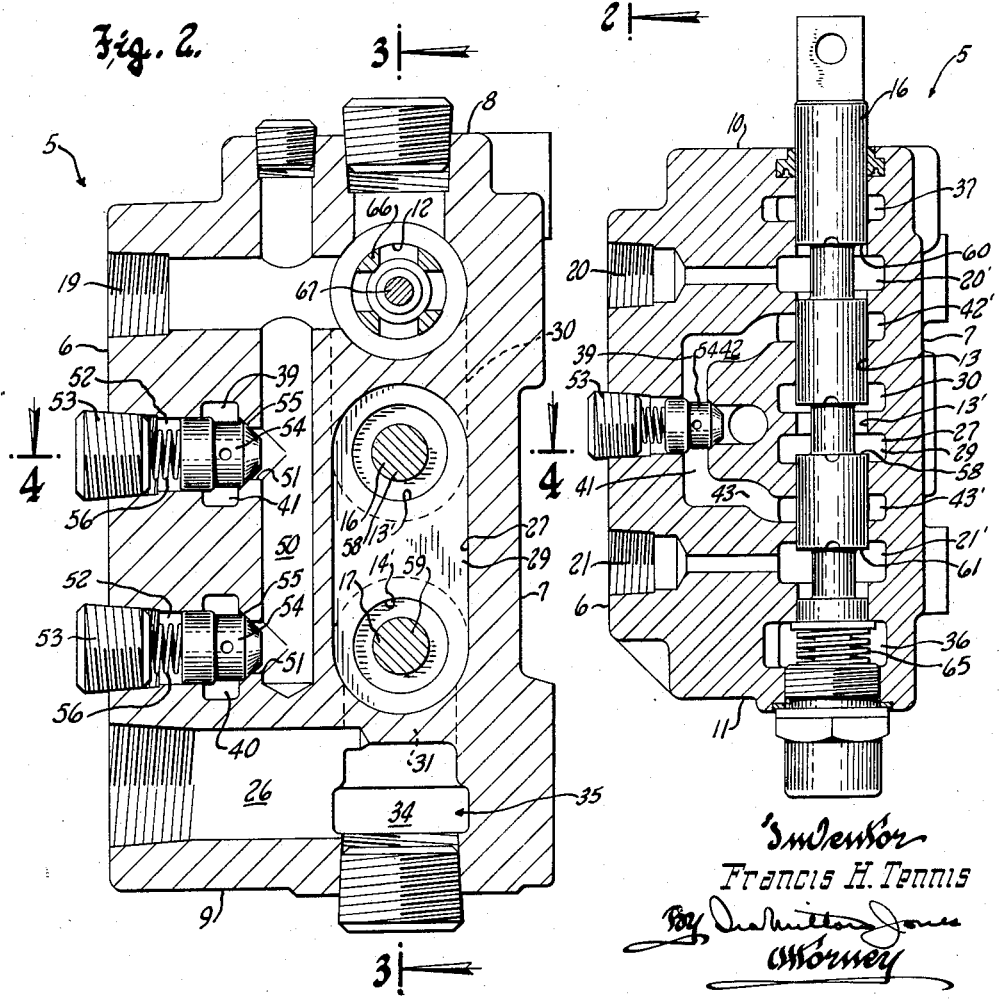
Inventor
Francis H. Tennis
Attorney Feb. 17, 1959   F. H. TENNIS   2,873,762
CONTROL VALVE FOR FLUID PRESSURE OPERATED MECHANISMS
Filed June 27, 1955   3 Sheets-Sheet 2
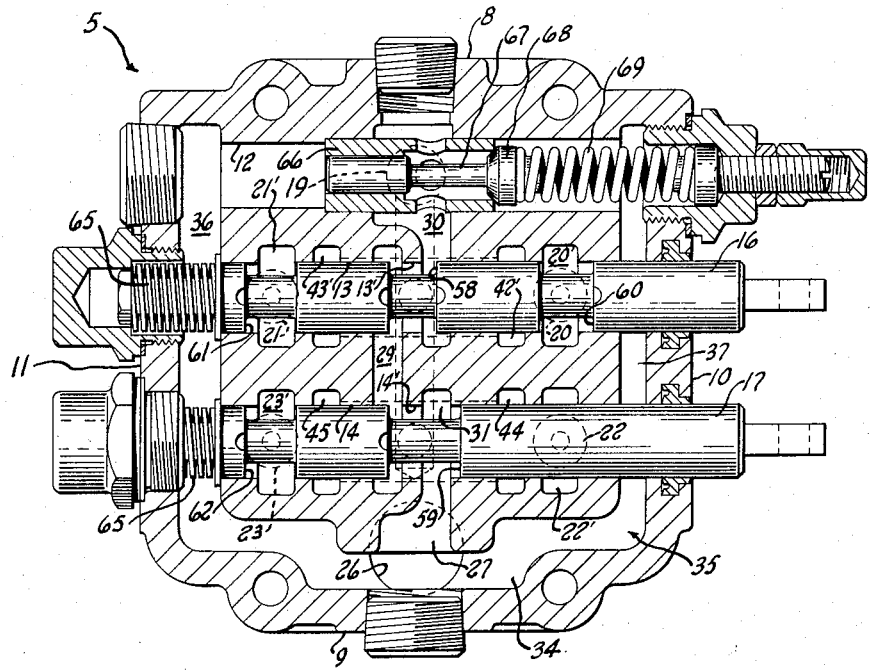
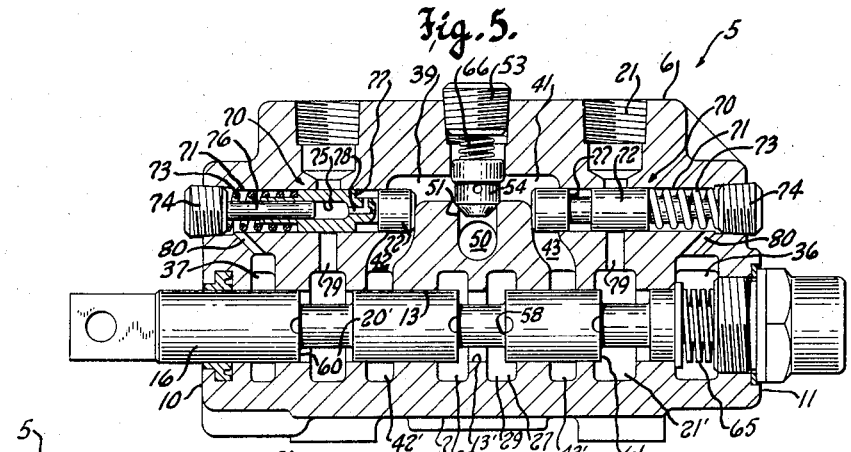
Inventor
Francis H. Tennis
By
Attorney Feb. 17, 1959  F. H. TENNIS  2,873,762
CONTROL VALVE FOR FLUID PRESSURE OPERATED MECHANISMS
Filed June 27, 1955  3 Sheets-Sheet 3
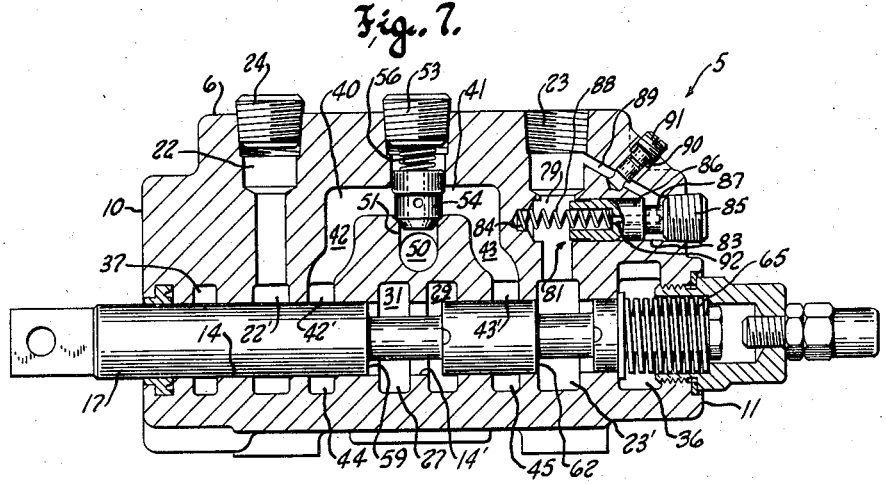
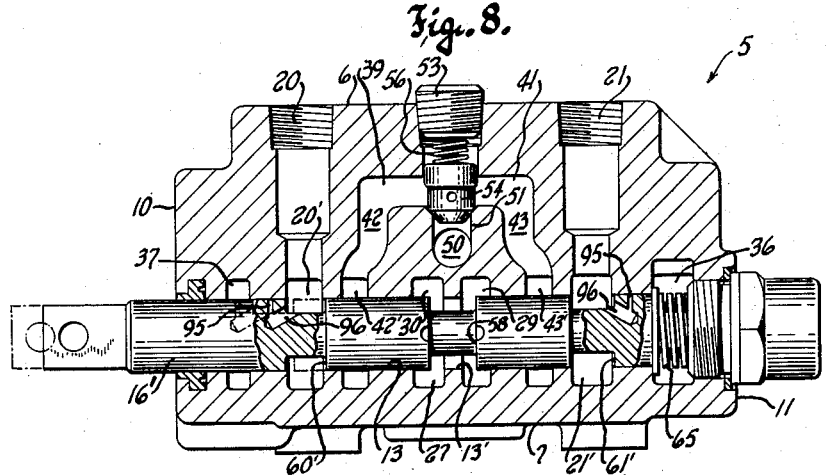
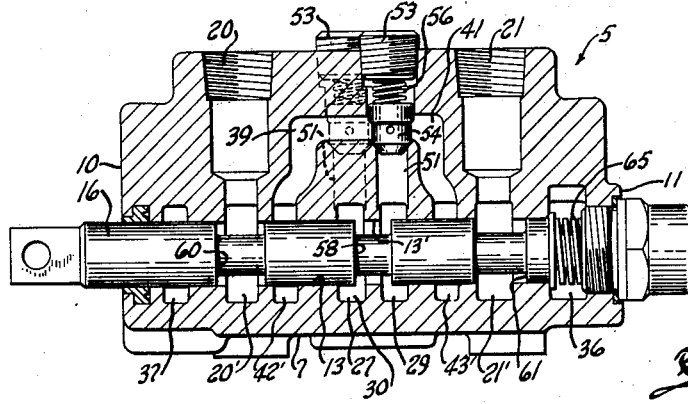
Inventor
Francis H. Tennis
By
Attorney United States Patent Office 2,873,762
Patented Feb. 17, 1959

2,873,762

CONTROL VALVE FOR FLUID PRESSURE OPERATED MECHANISMS

Francis H. Tennis, Milwaukee, Wis., assignor to Hydraulic Unit Specialties Co., Waukesha, Wis., a corporation of Wisconsin Application June 27, 1955, Serial No. 518,296

11 Claims. (Cl. 137—621)

This invention relates to control valves similar to that disclosed in the copending application of Dana J. Schneider and Francis H. Tennis, Serial No. 273,202, filed February 25, 1952, now Patent No. 2,745,433 and of the type employed to govern the operation of fluid pressure actuated mechanisms such as hydraulic cylinders, or other hydraulic equipment.

In general, it is an object of this invention to provide a control valve which is readily adaptable to almost any type of service.

More specifically, it is an object of this invention to provide an all purpose control valve featuring a valve body which, with little or no alteration, enables the valve to be readily converted to suit almost any service requirement, including the control of one or more single or double acting hydraulic cylinders or even a mixed group thereof, without danger of operation of one of the cylinders affecting a concurrently operated cylinder.

With the above and other more specific objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a front elevational view of the control valve of this invention;

Figure 2 is a vertical sectional view of the valve shown in Figure 1 taken along the plane of the line 2—2;

Figure 3 is a vertical sectional view taken through Figure 2 along the plane of the line 3—3;

Figure 4 is a cross-sectional view taken through Figure 2 along the plane of the line 4—4;

Figure 5 is a cross-sectional view similar to Figure 4, but illustrating another form of the invention;

Figure 6 is a cross-sectional view similar to Figure 5 but illustrating the positions of the parts when the valve is operating;

Figure 7 is a cross-sectional view similar to Figure 4 and illustrating another embodiment of the invention;

Figure 8 is a cross-sectional view similar to Figure 4 and illustrating still another embodiment of the invention, and Figure 9 is a cross-sectional view similar to Figure 4 and illustrating the manner in which the valve therein shown may be converted for series operation.

Referring now more particularly to the accompanying drawings in which like numerals designate like parts throughout the several views, the numeral 5 generally designates the casing or valve body for the control valve of this invention. The body comprises a substantially flat rectangular casting providing front and rear walls 6 and 7 respectively, top and bottom walls 8 and 9, respectively, and opposite end walls 10 and 11.

The body is provided with three spaced parallel bores 12, 13 and 14 and with the axes of the bores horizontal and normal to the end walls 10 and 11. The bores 12 and 14 are located near the top and bottom of the body, respectively, and the bore 13 is disposed substantially midway therebetween, as seen best in Figure 3. The axes of these bores lie in a common vertical plane substantially parallel to the front and back walls 6 and 7 of the body.

Each of the bores intersects and communicates with a number of passages formed in the interior of the valve body to enable valve elements 16 and 17 endwise slidably received in the bores 13 and 14, respectively, to control the flow of fluid under pressure to a plurality of hydraulic cylinders or other pressure operated mechanisms (not shown).

For instance, fluid under pressure may be directed into one end or the other of a double acting hydraulic cylinder (not shown) by the valve element 16 upon sliding of the same in one direction or the other out of its neutral position shown in Figure 3. Such fluid may be brought into the valve body through an inlet port 19 opening to the front of the body near its top and leading into the adjacent side of the upper bore 12 therein medially of its ends. As will be described shortly, fluid thus entering the body may be caused to issue from either one of a pair of high pressure outlets 20 and 21 in the valve body opening to the front thereof and respectively leading rearwardly into pressure wells 20' and 21' formed as enlargements of the bore 13 near but a distance inwardly of the opposite ends of the latter. It will be appreciated that fluid exhausted from the double acting cylinder will be returned to the valve body through the other of said high pressure outlets.

Another pair of high pressure outlets 22 and 23 likewise opening to the front of the valve body but respectively leading rearwardly into pressure wells 22' and 23' formed as enlargements of the lower bore 14 below the wells 20' and 21', are provided to control a second double acting hydraulic cylinder by the sliding motion of the valve element 17 in its bore or, as in the case illustrated, to control operation of a single acting hydraulic cylinder when the high pressure outlet 22 is closed by a plug 24 threaded into its mouth. Referring to Figures 3 and 4, it will be noted that both pairs of high pressure outlets 20—21 and 22—23 are disposed on axes which are substantially normal to the common plane of the bores 13 and 14.

At a location spaced below the lower bore 14 and in vertical alignment with the inlet 19, the body is provided with an outlet 26 opening to the front of the body and serving as an exhaust port for the control valve. The inner end of the outlet or exhaust port 26 communicates with the lower end of a central vertically disposed through passage 27 having its upper end communicating with the inner end of the inlet 19. Normally when the two valve elements 16 and 17 are in their neutral positions seen in Figure 3, fluid under pressure entering the inlet 19 flows downwardly in the through passage and out of the valve body through the outlet or exhaust port 26.

As seen best in Figure 3, the through passage 27 comprises three upright communicated cored sections, an intermediate section 29 spanning the two bores 13 and 14, and upper and lower sections 30 and 31 respectively communicating with the bores 13 and 14 but disposed axially a distance to one side of the ends of the intermediate section 29 and communicated therewith through holes 13' and 14' in the body coaxial with the bores and forming part of the latter. The upper section 30 of the through passage, of course, constitutes the inlet end portion of the through passage since it leads upwardly into the bore 12 at a location substantially medially of its ends, while the lower or outlet section 31 of the through passage opens to the outlet 26 and also into the horizontally disposed bight portion 34 of a U-shaped exhaust passage, generally designated 35.

The left end right branches 36 and 37 of the U-shaped exhaust passage extend upwardly in the body adjacent to the opposite ends 10 and 11 thereof to intersect and communicate with all three bores 12, 13 and 14 at locations outwardly of the pressure wells 20'—21' and 22'—23' in their respective bores 13 and 14.

According to the present invention, identical substantially U-shaped high pressure branched passages 39 and 40 are provided for the valve elements 16 and 17, respectively. The high pressure passage 39 for the valve element 16 has its bight portion 41 extending horizontally along the central portion of the valve body parallel to its valve element and midway between the latter and the front 6 of the valve body. The opposite leg portions 42 and 43 of the high pressure passage 39 extend rearwardly from the bight 41 and inwardly of the outlets 20 and 21, and respectively terminate in pressure wells 42' and 43' formed as cored enlargements of the bore 13 each located intermediate the through passage and one of the wells 20'—21' at the inner ends of the high pressure outlets.

Thus it will be seen that the leg portions 42 and 43 of the high pressure branched passage 39 extend at right angles to the common plane of the valve elements 16 and 17 and substantially crosswise of the through passage 27.

The high pressure branched passage 40 for the lower valve element 17 is identical in every respect with the high pressure passage 39 for the upper valve element 16, and its opposite leg portions likewise terminate in pressure wells 44 and 45 formed as cored enlargements of the bore 14, each located intermediate the through passage and one of the pressure wells 22'—23' at the inner ends of the high pressure outlets 22 and 23 for the lower valve element 17.

Both high pressure branched passages 39 and 40 are supplied with fluid under pressure from the inlet 19 by means of a vertical feeder passage 50 extending downwardly in that portion of the valve body embraced by the U-shaped high pressure branched passages.

The upper end of the feeder passage, of course, communicates with the inlet 19 as seen best in Figure 2, and the lower end of the feeder passage terminates on a level corresponding to that of the high pressure branched passage 40 just above the outlet 26 of the valve body. Each of the high pressure branched passages 39 and 40 has its bight portion communicated with the feeder passage by a short bore 51 which opens to the front of the valve body through a counterbore 52. A plug 53 closes the mouth of each of these counterbores and serves to retain a check valve 54 therein, the check valve being slidable toward and from engagement with a seat 55 on the valve body, facing the mouth of the counterbore and surrounding the bore 51. A compression spring 56 confined between each of the plugs and the adjacent check valve urges the latter toward engagement with its seat, but yields upon a rise of pressure in the feeder passage to allow fluid to flow into one or the other of the high pressure branched passages 39 and 40.

As stated previously, the valve element 16 is adapted to control the flow of fluid under pressure to either one end or the other of a double acting hydraulic cylinder, while the valve element 17 is adapted to control the flow of fluid to a single acting hydraulic cylinder. Both valve elements, when in their neutral positions shown in Figure 3, permit fluid entering the inlet 19 to flow downwardly in the through passage 27 and out through the exhaust port 26. Such flow of fluid through the valve body results from the fact that the valve element 16 has an annular groove 58 in its mid portion of a length to assure communication between the branches 29 and 30 of the through passage through the hole 13', while the lower valve element 17 is similarly provided with an annular groove 59 in its mid portion of a length to assure communication between the branches 29 and 31 of the through passage through the hole 14'.

The valve element 16 also has two more annular grooves 60 and 61 cut therein, each aligning with one of the pressure wells 20'—21' for the high pressure outlets when the valve elements is in the neutral position shown in Figure 3. The valve element 17, however, has only one more annular groove 62 therein, aligning with the pressure well 23' for the high pressure outlet 23 in the neutral position of the valve element.

Assuming that the valve element 16 is actuated to the left from the neutral position seen in Figure 3, it closes the hole 13' communicating the two upper branches 29 and 30 of the through passage, connects the two pressure wells 20' and 42' through the groove 60 in the valve element, and connects the pressure well 21' with the left branch 36 of the exhaust passage through the groove 61 in the opposite end portion of the valve element. The closure of the through passage 27 by actuation of the valve element in the direction described causes pressure to build up in the feeder passage 50 and unseating of the check valve 54 for the high pressure branched passage 39, and results in the flow of hydraulic fluid from the leg portion 42 of the U-shaped branch passage 39 into the high pressure passage 20 to one end of a double acting cylinder to cause actuation of the ram thereof in one direction. Fluid exhausted from the other end of the double acting cylinder will enter the valve body through the high pressure outlet 21 and will flow into the left hand branch 36 of the relief passage through the groove 61 in the valve element 16.

If the valve element 16 is actuated to the right from its neutral position seen in Figure 3, the fluid under pressure leaves the valve body through high pressure outlet 21 and returns through high pressure outlet 20 to the right hand branch 37 of the exaust passage.

In order to effect actuation of a single acting hydraulic cylinder, the valve element 17 in the lower bore 14 is slid to the right (as seen in Figure 3) a distance to close the hole 14' communicating the two lower branches of the through passage 27 and to communicate the pressure wells 45 and 23' by means of the annular groove 62 in the left hand end of the valve element 17. When this occurs, the closure of the through passage by the valve element 17 causes pressure to build up in the feeder passage 50 and to unseat the check valve in the high pressure branched passage 40, resulting in the flow of fluid through the left hand leg portion thereof and into the pressure well 23' from whence the pressure fluid issues through the single high pressure outlet 23 to be conducted to the single acting hydraulic cylinder. The other high pressure outlet 22, of course, is closed by the plug 24.

Whenever the valve element 17 is shifted to the left from its neutral position seen in Figure 3, fluid will be exhausted from the single acting cylinder into the high pressure outlet 23 of the valve body and conducted into the left hand branch 36 of the exhaust passage through the annular groove 62 in valve element 17.

The manner in which the high pressure outlets of the valve are connected with single and double acting hydraulic cylinders as well as the manner in which the valve elements are automatically returned to their neutral positions by centering springs 65, is described at greater length in the copending application of Dana J. Schneider and Francis H. Tennis, Serial No. 273,202, filed February 25, 1952, now Patent No. 2,745,433 to which reference may be had.

One of the features of the construction described thus far is that separate high pressure branched passages 39 and 40 are provided for the two valve elements of the assembly. With this arrangement, both of the valve elements 16 and 17 may be operated at the same time without any danger of interlinking the hydraulic cylinders controlled thereby through the valve passages as has been possible with some control valves in the past. Thus there is no possibility that during concurrent operation of either two double acting hydraulic cylinders or a mixed group of single and double acting cylinders, greater pressure of fluid in one of the cylinders can result in a flow of fluid from said cylinder to another cylinder then being operated by the valve.

It will also be appreciated that the provision of a separate U-shaped high pressure branched passage for each valve element enables a single check valve positioned intermediate the leg portions of each high pressure branched passage, to serve both high pressure outlets for the valve element associated therewith. Ordinarily, two check valves are employed for each double acting valve element of a conventional control valve.

A more or less conventional relief valve mechanism is contained within the upper bore 12. While this relief valve mechanism is somewhat similar to that of the aforementioned copending application of Dana J. Schneider and Francis H. Tennis, it is somewhat simpler in construction. It comprises a sleeve 66 in the bore 12 extending across the junction thereof with the upper end of the through passage 27, and having the customary ports in its side wall to communicate the inlet 19 of the valve with the interior of the sleeve as well as with the through passage. The stem 67 of the relief valve is axially movable in the sleeve and the head 68 of the valve is arranged to seat on the right hand end of the sleeve to close the same. It is understood, of course, that the extremity of the valve stem is enlarged to slidably fit the sleeve and to close the end thereof to the left of the ports in the side wall of the sleeve.

A strong compression spring 69 acting on the head of the valve yielding maintains it seated on the adjacent end of the sleeve, and this spring yields only when the pressure of hydraulic fluid in the inlet 19 and the feeder passage rises above a safe level and unseats the valve. At such times, the hydraulic fluid flows along the bore 12 into the right hand branch 37 of the relief passage to prevent damage to the control valve and the hydraulic system governed thereby. During normal operation, the relief valve is maintained closed by its spring 69, in which position all of the hydraulic fluid entering the inlet 19 of the valve body must flow either into the through passage 27 or the feeder passage 50.

The control valve of this invention is also readily susceptible to modification, with a minimum of alteration, to render the valve particularly useful in installations where it is not only desirable but essential that the flow of fluid exhausted from one end of a hydraulic cylinder be positively controlled. Figure 5, for example, shows how the control valve described may be equipped with fluid pressure responsive plunger mechanisms 70 each adjustably governing one of the high pressure outlets 20 and 21 to provide for unrestricted outflow of high pressure fluid from one of the high pressure outlets and automatically regulated return flow of fluid through the other high pressure port.

Due to the particular shape and disposition of the high pressure branched passages 39—40, these pressure responsive plunger mechanisms may be very easily incorporated in the control valve without changing the body casting. As seen in Figure 5, the plunger mechanisms for the valve element 16 require the valve body to be provided with a pair of opposing bores 71 leading into the opposite ends 10 and 11 of the valve body parallel to the bight 41 of the branched passage 39. These bores intersect the small diameter intermediate portions 79 of the outlets 20 and 21 and the inner ends of the bores connect with the leg portions 42 and 43 of the branched passage 39 near their junctions with the bight portion 41.

Each of the fluid pressure responsive mechanisms 70 comprises a plunger 72 slidably received in one of the bores 71 and of a diameter larger than the passages 79 to normally close the same. The plungers 72 ordinarily occupy positions having their inner ends disposed in the leg portions 42 and 43 of the high pressure branched passage 39, toward which position they are yieldingly urged by coiled compression springs 73 reacting between the plungers and plugs 74 threaded into the mouths of the bores 71.

Each of the plungers 72 has a coaxial hole 75 opening to its outer end to slidably receive a pin 76 disposed lengthwise between the adjacent plug 74 and the bottom of the hole in the plunger. These pins normally engage their respective plugs and terminate short of the bottom of the holes 75 in the plungers so as to allow the latter to slide axially outwardly a distance sufficient to carry an annular groove 77 in the inner end portion of each plunger into registry with the passage 79 of the adjacent high pressure outlet. The groove 77 of each plunger is communicated with the hole 75 therein by means of relatively small diameter angled passages 78, one branch of which extends axially inwardly from the bottom of the hole 75 in the plunger, and the other branch of which extends radially outwardly to open into the groove 77 of the plunger.

With the valve element 16 in its neutral position shown in Figure 5, both plungers 72 are urged inwardly toward one another into the leg portions 42 and 43 of the high pressure branched passage 39, due to the absence of pressure in the branched passage at that time. When the plungers occupy these positions, their annular grooves 77 are displaced axially inwardly from the passages 79 of the high pressure outlets 20—21 and the latter are closed by the plungers.

Assuming that the high pressure outlets 20—21 are connected with the opposite ends of a double acting hydraulic lifting cylinder and that the valve element 16 is shifted to the right, from neutral, to the position seen in Figure 6 to effect lowering of the load carried by the cylinder. This effects closure of the through passage and causes pressure to build up in the high pressure branched passage 39, pushing both plungers 72 outwardly in opposite directions to positions at which their grooves 77 are substantially in alignment with the passages 79 of the high pressure outlets 20 and 21 to open the same.

With the valve element 16 in its position seen in Figure 6, the groove 60 of the valve element communicates the pressure wells 20' and 42' to connect the high pressure branched passage 39 with the outlet 20, while the groove 61 of the valve element communicates the well 21' of the outlet 21 with the branch 36 of the relief passage 35. Hence, fluid under pressure then flows out of the high pressure outlet 20 into one end of the hydraulic lift cylinder to cause the same to lower the load connected therewith. The fluid exhausted from the other end of the cylinder is returned to the valve body through the high pressure outlet 21 and is led into the branch 36 of the relief passage through the annular groove 61 in the valve element.

If the load on the hydraulic cylinder descends at the desired safe rate, the plunger 72 for the high pressure outlet 21 remains in its outward position at which its groove 77 does not materially interfere with the return flow of fluid through the high pressure outlet 21 and into the relief passage 35. In other words, the force acting upon the inner end of the plunger which is exposed to the pressure of fluid in the high pressure branched passage 39 is balanced by the combined forces of the spring 73 and that of return fluid in the hollow interior 75 of the plunger.

However, if by reason of a heavy load on the hydraulic cylinder, the load begins to descend faster than desired, more or less in an uncontrolled fashion, the pressure of return fluid in the passage 79 of the outlet 21 and in the hollow interior 75 of the plunger quickly rises to a value at which the combined forces tending to shift the plunger to the left exceed the force acting on the inner end of the plunger which tends to hold it shifted to the right. When this occurs, the plunger for the high pressure outlet 21 is caused to be partially shifted to the left, as seen in Figure 6, to whatever position of misalignment between its groove 77 and the passage 79 of high pressure outlet 21 effects sufficient throttling of the flow of fluid to the relief passage as will result in rebalancing of the forces acting in opposite directions on the plunger. Thus, under the conditions outlined, the plunger 72 controlling the high pressure outlet 21 will occupy a position such as seen in Figure 6, partway between its inner and outer limits of travel, at which its groove 77 is only partially in alignment with the passage 79 of high pressure outlet 21.

It will be seen, therefore, that the action of the fluid pressure responsive plunger mechanisms is entirely automatic, in that they will increasingly restrict the return flow of fluid through either high pressure outlet 20—21 in proportion to the increase in pressure of the fluid entering the outlet.

Attention is directed to the fact that the plunger controlling either high pressure outlet from which fluid issues from the valve body, does not in anyway restrict the flow of fluid to the double acting cylinder.

As will be readily apparent from Figures 5 and 6, the inner positions of the plungers are defined by their engagement with the outwardly facing walls of the leg portions 42 and 43 of the high pressure branched passage 39, while their outer positions may be defined by the engagement of the extremities of the stems 76 with the bottoms of the holes 75 in the plungers.

In order to assure relatively free axial shifting of the plungers in response to a differential in the pressures of fluid in their holes 75 and in the high pressure branched passage 39, each of the bores 71 for the plungers is vented to the adjacent branch of the U-shaped relief passage 35 by means of a small diameter drilled passage 80.

It is also important to note that where one of the high pressure outlets 20 or 21 is plugged and a valve element 17 such as that shown in Figure 3 is employed to control the flow of pressure fluid to a single acting hydraulic cylinder, only one fluid pressure responsive plunger mechanism 70 is required to control the flow of return fluid through the unplugged high pressure outlet, without in anyway restricting the outward flow of pressure fluid through said high pressure outlet.

While the pressure responsive plunger mechanisms described in connection with Figures 5 and 6 depend upon the particular arrangement and shape of the U-shaped high pressure branched passages in order to achieve controlled lowering of a hydraulic lift cylinder, the construction shown in Figure 7 achieves a similar purpose but does not depend upon the specific type of U-shaped high pressure branched passages described previously. Thus, while Figure 7 discloses a valve element 17 like that shown in the lower bore 14 of Figure 3 for the control of a single acting hydraulic cylinder, the U-shaped high pressure branched passage 40 associated with the valve element 17 has been illustrated merely to show the versatility of the control valve of this invention.

The fluid pressure responsive mechanism 81 in this case, depends to a considerable extent upon the passage 79 for the high pressure outlet 23 being of smaller diameter than the mouth of the latter. Also, the pressure responsive plunger mechanism, in this case, requires the valve body to be bored inwardly from its end 11 as at 83, with the bore parallel to the bore 14 and intersecting the passage 79. The bore 83 preferably extends into the valve body inwardly of the passage 79 and terminates in a smaller diameter well 84.

The mouth of the bore 83 is closed by a threaded plug 85, and a plunger 86 is slidable in the bore to and from the inoperative position shown in Figure 7, at which a reduced extremity 87 on the outer end of the plunger engages the plug 85. The inner end of the plunger is bored to receive one end portion of a coiled compression spring 88 having its opposite end received in the well 84 at the inner end of the bore 83, and the spring, of course, yieldingly urges the plunger to its inoperative position defined by the engagement of its reduced extremity with the plug 85.

The valve body is also provided with an angled passage 89 having one end communicating with the bore 83 just inwardly of the plug 85 and its opposite end leading into the enlarged mouth of the high pressure outlet 23. This angled passage may be adjustably restricted by the inner end portion 90 of an adjusting screw 91 threaded into the valve body and which, in its innermost position, is capable of entirely blocking off the angled passage 89.

Drilled passages 92 in the plunger connect its left hand end with the space surrounding the reduced outer end portion of the plunger. One branch of these drilled passages 92 leads radially into the reduced outer end portion of the plunger and connects with the other branch which extends axially inwardly to the bottom of the well in the inner end portion of the plunger.

Assuming that the control valve shown in Figure 7 has its high pressure outlet 23 connected with a single acting hydraulic cylinder which is adapted to lift a heavy load, the cylinder may be actuated to lift the load upon sliding of the valve element 17 to the left from its neutral position shown. This closes off the through passage 27 so that fluid under pressure enters the high pressure branched passage 40 and flows into the pressure well 23' which connects with the high pressure outlet 23 of the valve, thus operating the hydraulic cylinder. The pressure in passage 79 assures that the fluid pressure responsive mechanism 81 will remain inoperative during such actuation of the hydraulic cylinder, and fluid flows unrestrictedly through passage 79 to the outlet 23.

When the valve element 17 is shifted to the right from its neutral position shown, it connects the pressure well 23' of the high pressure outlet 23 with the adjacent branch 36 of the relief passage to provide for the exhaust of fluid from the cylinder, thereby resulting in lowering of the load connected with the cylinder. It is at this time that the fluid pressure operated mechanism 81 functions.

During the return flow of hydraulic fluid into the high pressure outlet 23, the fluid flows past the inner end of the plunger 86 and exerts little or no pressure thereon tending to move the same to the right in the direction in which it is yieldingly urged by the spring 88. The pressure of hydraulic fluid in the larger mouth of the outlet 23, however, will be greater than that of fluid flowing through the restricted passage 79 past the inner end of the plunger, and this results in a build up of static pressure in the angled passage 89 and the space surrounding the reduced extremity 87 of the plunger, with the result that the plunger is shifted to the left against the force of the spring 88 to a position at which its inner end partially closes and restricts the passage 79.

The extent to which the passage 79 is restricted will, of course, depend partly upon the rate that hydraulic fluid is exhausted from the cylinder under the force of the load thereon, and partly upon the setting of the adjusting screw 91. Consequently, when the adjusting screw 91 is backed out to leave the angled passage 89 substantially unrestricted, the greatest control over the descent of the load operated by the hydraulic cylinder will be achieved and, conversely, a decreasing amount of control over the descent of the load is had upon turning the adjusting screw inwardly to increasingly restrict the angled passage 89.

Thus, it will be apparent that, since the plunger 86 will be shifted to the left during the descent of the load, it will meter the flow of hydraulic fluid through passage 79 to the branch 36 of the relief passage an extent substantially proportional to the pressure in the mouth of the high pressure outlet 23. The load will thus be lowered in a controlled fashion by the automatic operation of the plunger 86, regardless of the magnitude of the load.

Under certain operating conditions, as for instance when an excessively heavy load tends to cause too rapid descent of the hydraulic cylinder, the pressure acting upon the right hand end of plunger 86 may cause the latter to be shifted all the way to the left to substantially close the passageway 79. Such a condition, however, can exist only momentarily by reason of the fact that the angled passage 89 and the drilled passages 92 in the plunger very quickly effect a balancing of pressures at the opposite ends of the plunger, and the compression spring 88 then shifts the plunger slightly to the right to partially open the passage 79 and to permit further controlled lowering of the load.

Figure 8 discloses still another way of achieving controlled exhaust of fluid from either end of a double acting hydraulic cylinder, without restricting the flow of pressure fluid to the cylinder. The control valve shown in Figure 8 is generally like that of Figure 4, but the grooves 60' and 61' in its valve element 16' have an axial length so related to the spacing between the branches 36 and 37 of the relief passage and their adjacent pressure wells 20' and 21' that neither of the grooves is capable by itself of establishing communication between the relief passage branches and the adjacent pressure wells for the high pressure outlets upon actuation of the valve element in one direction or the other. The grooves 60' and 61' do, however, establish full communication between the pressure wells 42' and 43' of the high pressure branched passage 39 and the adjacent pressure wells 20' and 21' upon actuation of the valve element in opposite directions so that the flow of fluid under pressure out through either of the high pressure outlets is unrestricted.

In this case, fluid exhausted from one end of a hydraulic cylinder being actuated by the control valve flows into the outlet 20, for instance, and into its pressure well 20' to the adjacent groove 60' of the valve element 16', and such return fluid is conducted into the adjacent branch 37 of the relief passage through a small diameter radially disposed metering passage 95 in the valve element, spaced axially outwardly of the groove 60' therein. The inner end of this radial metering passage joins with a drilled angled passage 96 opening to the adjacent groove 60'. The metering and angled passages 95 and 96, of course, are duplicated at the other end portion of the valve element 16', axially outwardly of the groove 61'.

Thus, if the valve element 16' is shifted to the left from its neutral position shown, its groove 61' establishes full communication between the pressure well 43' of the high pressure passage 39 and the high pressure outlet 21 through the pressure well 21' of the latter, and hydraulic fluid may then flow out of the valve body to one end of a double acting hydraulic cylinder to actuate the same. The hydraulic fluid exhausted from the other end of the hydraulic cylinder returns to the valve body through the high pressure outlet 20, but since the groove 60' has insufficient length to span the axial space between the pressure well 20' of the outlet 20 and the adjacent branch 37 of the relief passage, the return fluid must flow through the angled passage 96 and outwardly through the small diameter metering passage 95 which, in the shifted position of the valve described, opens into the branch 37 of the relief passage.

With this construction it will be appreciated that the load operated by the double acting hydraulic cylinder can travel only as fast as the metering passages 95 allow hydraulic fluid to be returned to the relief passage in the valve body. This is especially desirable in cases where the load operated by the cylinder tends to effect exhaust of hydraulic fluid from the cylinder at a rate faster than that at which pressure fluid is delivered to the cylinder, under which conditions it was possible previously to draw a vacuum in that end of the cylinder being supplied with hydraulic due to the faster rate of exhaust of fluid from the other end of the cylinder.

Obviously, the same metering effect is achieved when the valve element 16' is shifted to the right from its neutral position seen in Figure 8, at which time the groove 60' of the valve element establishes full communication between the pressure well 42' of the high pressure branched passage 39 and the pressure well 20' connecting with the high pressure outlet 20. This allows fluid under pressure to flow unrestrictedly to the hydraulic cylinder through the high pressure outlet 20, while the fluid exhausted from the other end of the cylinder enters the high pressure outlet 21 and can reach the branch 36 of the relief passage only by travelling through the angled passage 96 and the small diameter metering passage 95 at the right hand end portion of the valve element.

Figure 9 shows how the control valve of this invention may be easily made into a series valve for controlling a plurality of hydraulic cylinders, but by which only one cylinder can be operated at a time. The double acting valve element 16 corresponds to the upper valve element in Figure 3, and it will be understood that the control valve has at least one more valve element (not shown), for instance corresponding to the lower valve element 17 of the Figure 3 embodiment, located beneath the double acting valve element seen in Figure 9.

The only changes in the valve body shown in this embodiment from that of Figures 1 to 4, inclusive, are in the drilling of the body passages, so that the body casting may be the same in each instance. Thus, the feeder passage 50 shown in all of the previous embodiments of the invention has been omitted, and the high pressure branched passages 39 and 40 are individually connected to different sections of the through passage 27 by inward extensions of the bores 51. The bores 51, however, are staggered so that the bore joining with the upper high pressure branched passage 39 is in line with and opens into the upper section 30 of the through passage 27, while the bore joining with the lower high pressure branched passage 40 is in line with and opens into the intermediate section 29 of the through passage.

With the arrangement described, it will be apparent that each of the U-shaped high pressure branched passages can be supplied with fluid under pressure only from the through passage 27. Consequently, if the upper valve element 16 is shifted in either direction from its neutral position shown in Figure 9 to close off the hole 13' in the bore 13, fluid entering the through passage from the inlet 19 is constrained to flow into the upper high pressure branched passage 39. With the valve element 16 shifted out of neutral, fluid from the source cannot reach the lower high pressure branched passage 40, due to the fact that the intermediate and upper branches 29 and 30, respectively, of the through passage are closed off from one another by the upper valve element 16.

Consequently, only that hydraulic cylinder which is controlled by the valve element 16 can be operated under such conditions, and the cylinder controlled by the lower valve element 17 can only be operated when the valve element 16 is in its neutral position shown in Figures 3 and 9.

From the foregoing description taken together with the accompanying drawings, it will be readily apparent to those skilled in the art that this invention provides an improved control valve featuring separate U-shaped high pressure branched passages for each of the shiftable valve elements, and in which automatic flow controlling mechanisms may be readily incorporated without alteration of the basic body casting.

What I claim as my invention is:

1. In a control valve of the character described: a valve body having a bore and a valve element slidable axially therein, said body having an inlet connectable with a source of fluid under pressure, an outlet, and an elongated through passage connecting the inlet and outlet and crosswise intersecting the bore intermediate its ends, and said body having a pair of high pressure outlets connecting with outlet passages extending crosswise of the bore and said through passage and communicating with the bore at zones spaced axially in opposite directions from the junction of the bore and the through passage, said body having an exhaust passage provided with branches which intersect said bore at zones near the junctions of the outlet passages with the bore, and said body being characterized by the provision of a high pressure branched passage connected with the body inlet and having a pair of branches each extending lengthwise alongside one of said outlet passages and likewise disposed crosswise of the bore and through passage, each of said branches communicating with the bore at a zone spaced from but adjacent to the junction of one of the high pressure outlet passages with the bore, and said outlet passages being selectively communicable with their respective branches of the exhaust and high pressure branched passages upon sliding of the valve element in opposite directions in its bore from a neutral position clearing the through passage to either of two operative positions closing the through passage and completely blocking the flow of fluid into the outlet portion of the through passage to cause the pressure of fluid entering the body inlet to build up in the branched passage and in which ever high pressure outlet passage is connected with the high pressure branched passage by the valve element; and said body being further characterized by the provision of a pair of other bores each crosswise intersecting one of the high pressure outlet passages and the adjacent branch of the high pressure branched passage, a plunger in each of said other bores slidable back and forth therein between a first position substantially clearing its outlet passage for the free flow of fluid therethrough to its high pressure outlet and a second position restricting its outlet passage to effect metering of the flow of fluid returned to the exhaust passage through its high pressure outlet, depending upon the position of the valve element, the pressure of fluid in said high pressure branched passage which obtains when the valve element is in either of said operative positions thereof imposing a force upon said plungers tending to hold each in said first position thereof at which fluid may flow freely through its outlet passage, and means for translating the pressure of return fluid obtaining in either high pressure outlet into a force on the plunger associated therewith tending to shift said plunger toward said second position thereof.

2. In a control valve of the type having a body provided with a bore and a valve element slidable axially in the bore between operating and exhaust positions, the valve body having an outlet passage communicating with said bore and opening to the exterior of the body through an enlarged mouth, and the body having a high pressure passage connectible with a source of fluid under pressure and communicating with said bore near but to one side of the junction of the bore with the outlet passage so as to be connected with the outlet passage through the bore upon sliding of the valve element to said operating position thereof, and the body having an exhaust passage communicating with the bore near but to the opposite side of the junction of the bore with the outlet passage so as to be connected with the outlet passage through the bore upon sliding of the valve element to said exhaust position thereof, said valve body being characterized by the provision of another bore leading into one side of said outlet passage at a zone between its mouth and its junction with the bore for the valve element, a plunger slidable in said other bore from an inoperative position substantially clearing the outlet passage for the free flow of fluid therethrough to the enlarged mouth thereof, to an operative position projecting into the outlet passage to restrict the same and thus effect metering of return fluid flowing into said outlet passage to the exhaust passage, one end of said plunger being exposed to the fluid pressure obtaining in the outlet passage when the latter is communicated with the high pressure passage by the valve element and maintained by said pressure in its inoperative position to assure unrestricted flow of fluid through the outlet passage to the mouth thereof, and passage means connecting the mouth of the outlet passage with said other bore adjacent to the opposite end of said plunger so that the pressure of return fluid in the mouth of the outlet passage is translated into a force on the plunger tending to move the same to its operative position restricting the outlet passage whenever the latter is communicated with the exhaust passage by the valve element.

3. The control valve set forth in claim 2, further characterized by the provision of a biasing spring acting upon said plunger to yieldingly resist motion thereof toward its operative position.

4. The control valve set forth in claim 3, further characterized by the provision of means on the body for adjustably restricting said passage means so as to enable regulation of the force tending to move the plunger to its operative position.

5. The control valve set forth in claim 4 wherein said adjustable restricting means comprises a screw threaded into the valve body and having its inner end disposed in said passage means.

6. In a control valve: a valve body having a bore to slidably receive a valve element, an inlet connectable with a source of fluid under pressure, a single through passage of substantially large cross section at all times communicated with the inlet and crosswise intersecting said bore at a first zone, a pair of high pressure outlets leading to said bore at second zones spaced axially of the bore from one another and from the first zone, and exhaust passage means separate from the through passage and communicating with the bore near the second zones; said body also having a pair of connected passages extending crosswise of the bore and the through passage, said connected passages having a common inlet portion connected with the body inlet and having their outlets communicated with said bore at third zones adjacent to the second zones; a valve element slidable axially in the bore in opposite directions from a neutral position at which the through passage is open across the bore but communication is blocked between both high pressure outlets, the outlets of said connected passages, and the exhaust passage means, to an operative position communicating one of said high pressure outlets with the outlet of one of said connected passages and the other high pressure outlet with said exhaust passage means, and in which operative position the through passage is blocked off to constrain fluid entering the body inlet to flow only through one of said connected passages to the high pressure outlet then communicated therewith; and a single check valve in the inlet portion of said connected passages, to serve both high pressure outlets, said check valve being arranged to normally close said connected passages and to open in response to the flow of fluid from the inlet through either of said connected passages whenever the valve element is in either of its operative positions.

7. In a control valve of the character described: a valve body having an inlet connectable with a source of fluid under pressure, an outlet, spaced parallel bores between the inlet and the outlet, an elongated through passage connecting the inlet and the outlet and crosswise intersecting the bores at a first zone thereof intermediate their ends, and a pair of high pressure outlet passages communicating with each of the bores at second zones spaced axially from one another and from the first zones; said body also having branched supply passage means for each bore the branches of which extend crosswise to said bore and to the through passage and communicate at one end with the bore at third zones spaced from one another and from the first and second zones to be communicable with the associated high pressure passages through said bore, the other ends of said branches being connected with a common inlet adapted to be supplied with pressure fluid fed into the body inlet; a valve element in each of said bores shiftable axially in opposite directions from a neutral position in which the through passage is open across the bore to a first operative position closing the through passage and communicating one of said second zones with one of said third zones and to a second operative position communicating said one second zone with the outlet, and in which operative positions the through passage is blocked off to constrain fluid entering the body inlet to flow only through that branch passage which is in communication with one of the high pressure outlet passages; and a single check valve in the inlet of each branched supply passage means, to serve each high pressure passage that may be communicated with the branched supply passage means, said check valve being arranged to normally close said branch passages at their second designated ends and to open in response to the flow of fluid from the inlet to the valve body through one of said branch passages whenever the valve element is in an operative position.

8. The control valve of claim 7 further characterized by the fact that each of said branched supply passage means has a separate inlet which communicates directly with the first zone of its bore so that fluid must flow from the body inlet through a portion of the through passage to enter one of the branched supply passage means, and so that movement of the valve element in a bore nearer the body inlet along the length of the through passage to one of its operative positions prevents flow of fluid in the through passage to the first zone of a bore farther from the body inlet.

9. The control valve of claim 7, further characterized by the fact that the valve body has a feeder passage directly communicating the body inlet with all of the inlets to said branched supply passage means so that pressure fluid may flow from the body inlet directly to each check valve without traversing the through passage.

10. In a control valve of the type having a body provided with a through passage leading from an inlet in the body to an outlet in the body, the inlet being connectable with a source of fluid under pressure, and having a valve element slidable axially in a bore in the body which crosswise intersects the through passage, said valve element being movable from a neutral position clearing the through passage, to either of two operative positions at each of which the valve element closes off the through passage completely, blocking the flow of fluid to the portion of the through passage downstream from the bore, and effects diversion of fluid entering the inlet to one of two high pressure outlet passages in the body leading to said bore at zones spaced from its junction with the through passage, said valve body being characterized by the provision of a branched passage having a single inlet passage connected with said inlet in the body and a pair of branch passages leading from said single inlet passage and each leading to said bore near the junction of the latter with one of said high pressure outlet passages and extending crosswise of the bore and said through passage; and further characterized by the provision of a single check valve controlling communication between the inlet passage and both of said branch passages, and normally closing off communication therebetween arranged to open in consequence of closure of the through passage by the valve element.

11. In a control valve: a valve body having a plurality of spaced parallel bores, a pair of high pressure outlet passages connecting with each bore and each leading to a motor port at the exterior of the body, and exhaust passage means communicable through each of said bores with both of its motor ports; a valve element in each bore, movable axially therein from a neutral position to either of two operating positions to selectively govern communication between its motor ports and the exhaust passage means; said body having an inlet and an outlet connected by a through passage which crosswise intersects all of the bores, and through which pressure fluid supplied to the body inlet flows freely to the body outlet when all of the valve elements are in their neutral positions, but which through passage is blocked by any one of the valve elements when it is in either operating position thereof; said body having supply passage means therein which includes all of said high pressure outlet passages and is communicated with the body inlet, and into which supply passage means pressure fluid is diverted as a consequence of blocking of the through passage by one of said valve elements, said supply passage means including a feeder passage common to the high pressure outlet passages of each bore, and through which feeder passage all of the pressure fluid flowing to either one of the motor ports associated with any one bore travels when the valve element in said one bore is in an operating position communicating the other motor port for said one bore with the exhaust passage means; and a single check valve in each of said feeder passages, all of said check valves being at locations spaced from the bores in which the valve elements operate.

References Cited in the file of this patent

UNITED STATES PATENTS

| | | |
|---|---|---|
| 2,477,669 | Stephens | Aug. 2, 1949 |
| 2,489,435 | Robinson | Nov. 29, 1949 |
| 2,586,932 | Gardner | Feb. 26, 1952 |
| 2,608,824 | Kirkham | Sept. 2, 1952 |
| 2,705,971 | Dorkins | Apr. 12, 1955 |
| 2,708,909 | Curlett | May 24, 1955 |
| 2,742,922 | Frellsen | Apr. 24, 1956 |
| 2,775,260 | Drennen | Dec. 25, 1956 |